Feb. 2, 1960 K. IMMENDORF 2,923,505

RESILIENT SUPPORT FOR RECORD PLAYERS

Filed March 29, 1956 2 Sheets-Sheet 1

Inventor
Karl Immendorf
By Michael S. Striker
Agt.

Feb. 2, 1960 K. IMMENDORF 2,923,505

RESILIENT SUPPORT FOR RECORD PLAYERS

Filed March 29, 1956

2 Sheets-Sheet 2

Inventor
Karl Immendorf
By Michael S. Striker
Agt.

United States Patent Office 2,923,505

Patented Feb. 2, 1960

2,923,505

RESILIENT SUPPORT FOR RECORD PLAYERS

Karl Immendorf, St. Georgen/Schwarzwals, Germany

Application March 29, 1956, Serial No. 574,662

Claims priority, application Germany April 7, 1955

2 Claims. (Cl. 248—20)

The present invention relates to a new and improved record player arrangement. More particularly, the present invention relates to a new and improved arrangement for regulating the position of the record player turntable carrying apparatus of the record player.

In record players using records of the disk type, the turntable which mounts and rotates the record must in turn be properly mounted in order to avoid vibration of the record player pick-up. In addition, vibration-free mounting of the turntable is necessary and desirable to avoid acoustic feedback to the pick-up arm.

A conventional arrangement for mounting the record player turntable support, is to mount the support on springs or other resilient means. In this manner the vibrations and acoustic feedback may be damped and avoided. However, when the record player is being transported from place to place, the weight of the turntable and its support very often strains the resilient mounting means unduly and sometimes breaks these resilient mounting means.

The present invention avoids these difficulties by providing a position-fixing and vibration-limiting arrangement which may be moved through several different positions. In one of the positions the turntable support is fixedly clamped to the carrying case of the record player so that the springs or other resilient means used for mounting purposes are rendered ineffectual. In another position of the position-fixing and vibration-limiting arrangement, the maximum amplitude of oscillation of the turntable is limited.

It is accordingly an object of the present invention to overcome the above described disadvantages of conventional record player arrangements.

A second object of the present invention is to provide a new and improved record player arrangement having a combined position-fixing and vibration-limiting arrangement.

Another object of the present invention is to provide a new and improved position-fixing and vibration-limiting arrangement for record players wherein the arrangement can be moved through a plurality of positions ranging from one position wherein the record player turntable is fixedly clamped to its support and a further limiting position wherein the entire record player turntable support can be lifted clear from the mounting case.

A further object of the present invention is to provide a new and improved position fixing and vibration-limiting arrangement for record players using a rotatable lever which may be rotated by hand through a plurality of positions.

Still another object of the present invention is to provide a new and improved position fixing and vibration-limiting arrangement which includes a slidably mounted hand-operated lever.

With the above objects in view, the present invention mainly consists of an arrangement used with a record player and including a base member, a record carrying member removably mounted on the base member, resilient means mounted between the base member and the record carrying member and resiliently urging the latter away from the base member, and a combined position fixing and vibration-limiting arrangement mounted on one of the members and adapted to engage the other of the members and being movable through a plurality of positions, in one of which the arrangement fixedly connects the carrying member to the base member so as to prevent relative movement between the same, in another of the positions of the arrangement, the same permits removal of the record carrying member from the base member, and in at least another of the positions, the arrangement limits the range of amplitude of oscillation of the members relative to each other.

In another embodiment of the present invention the position fixing and vibration-limiting arrangement includes a hand-operated rotatably mounted lever which may be rotated through a plurality of positions.

In another preferred embodiment of the present invention, the position fixing and vibration-limiting arrangement includes a hand-operated slidably mounted lever which can be moved through a plurality of positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
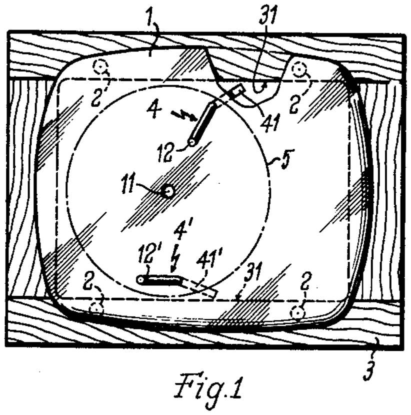
Fig. 1 is a plan view, partially broken away, of a record player turntable support and the mounting means therefor.

Referring now to the drawings and more particularly to Fig. 1, it can be seen that a base member 3, illustrated as being made of wood, is formed with a substantially centrally located enlarged opening bounded by an inner face 31 of the base member. Resiliently mounted above the base member 3 by means of four spaced coil springs 2, is a record carrying member 1. It can be seen that the record carrying member 1 substantially covers the entire opening in the base member 3 bounded by the inner face 31.

The record carrying member 1 is used for supporting the turntable of the record player and for this purpose is provided with a small opening 11 which is adapted to permit the passage of the driving shaft of the driving motor to the turntable, therethrough. The turntable and driving member therefor are not illustrated in the drawing in order not to unnecessarily complicate the drawing.

However a dotted circle 5 is shown which corresponds substantially to the outline of the turntable used for the disk record in the record player.

Mounted near the outer periphery of the dotted circle 5 are two turnably mounted levers 4 and 4'. These levers can best be seen in Figs. 4 and 5. Levers 4 and 4' are each respectively provided with upper portions 12 and 12' which extend above the record carrying member 1. These levers are also provided with lower respective lever portions 41 and 41' which extend beneath the record carrying member 1.

Figure 4:
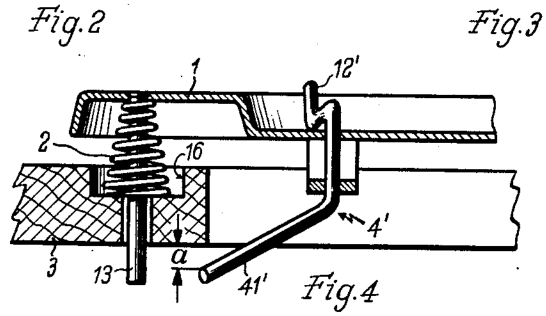
Fig. 4 is a sectional view of Fig. 1 showing the position fixing and vibration-limiting arrangement in the position of Fig. 2.
Figure 5:
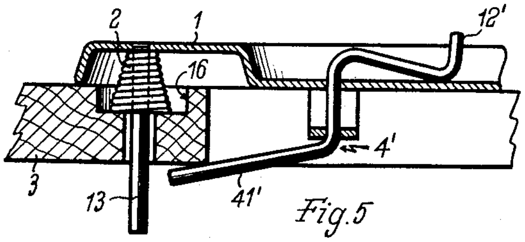
Fig. 5 is a partial transverse sectional view of Fig. 1.

In Figs. 4 and 5 it can be seen that the upper portion 12' of the lever 4' is mounted in a depression of the record carrying member 1 so that the upper part of the lever portion 12' does not extend into contact with the turntable when the same is mounted thereabove.

Also in Figs. 4 and 5, it can be seen that the record carrying member 1 is provided with a mounting pin 13 which extends through the corresponding coil spring 2 and hole 16 formed in the base member 3. That is, the base member 3 is formed with four mounting holes 16 adapted to correspond to the four mounting pins 13 of the record carrying member 1. Therefore, the record carrying member 1 may be easily removed from the base member 3 by lifting the record carrying member together with its mounting pins. If the turntable and driving motor therefor are also mounted on the record carrying member, the entire apparatus can be lifted out from the base member for maintenance purposes.

In the positions of the levers 4 and 4' illustrated in Fig. 1, these levers have been rotated so that the lower portions 41 and 41' thereof are completely within the opening of the base member 3 which is bounded by the inner face 31. Therefore, in this position, the record carrying member 1 can be completely removed from the base member 3 on which it is mounted. If the turntable and motor are also mounted on the record carrying member 1, it is clear that the entire apparatus can be easily removed from the base member 3, when the levers 4 and 4' are in the position illustrated in Fig. 1.

Figure 2:
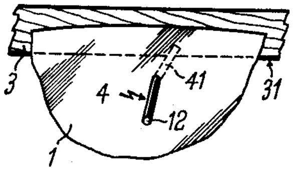
Fig. 2 is a partial plan view of the apparatus shown in Fig. 1 whereby the position-fixing and vibration-limiting arrangement is shown in a second position from that of Fig. 1.

In the position illustrated in Figs. 2 and 4, of the lever 4, it can be seen that the lever 4 has been rotated so that the lower portion 41, thereof extends beyond the boundary of the opening in the base member 3. However, as can best be seen in Fig. 4, the lower portion 41' of the lever 4' which has also been similarly rotated, is spaced from the space member 3 and the inner face 31 thereof a distance indicated by *a*. In this position, which corresponds to the playing position for the record, the record carrying member 1 is supported by the coil springs 2 on the base member 3. However, the range of amplitude of oscillation of the record carrying member 1 and 3 is limited. That is, in the event that some vibration is imparted to the record player and the record carrying member 1 starts to go into oscillation, it can be seen that the maximum distance that the record carrying member can move with respect to the base member 3 is limited by the distance between the lower portion 41' and the inner face 31 of the base member 3. Therefore this is ideally suited for the playing position of the record, since it provides a substantially vibration-free position on the record carrying member 1. At the same time it limits the maximum amplitude of oscillation of the record carrying member 1.

Figure 3:
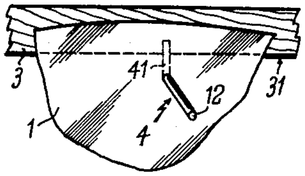
Fig. 3 is a partial plan view of a portion of Fig. 1, similar to Fig. 2, and showing the position fixing and vibration-limiting arrangement in a third position.

Referring now to Figs. 3 and 5 it can be seen that the members 4 and 4' have been further rotated so that the lower portions 41 and 41', respectively, engage the base member 3 at the inner face 31 thereof. In this position the levers 4 and 4' have been rotated into engagement with the base member 3 against the action of the coil springs 2 which tend to keep the record carrying member 1 separated from the base member 3. It therefore can be seen that the coil springs 2 have been compressed until the record carrying member 1 is substantially fixedly mounted on the base member 3 and relative movement between these two members is prevented. It is apparent that the coil springs 2 no longer act as resilient means in their fully compressed position.

The position illustrated in Figs. 3 and 5 corresponds to the transport position where the record player is being moved from one location to another. If the record player is the portable type of record player, for example, the transport position of the levers 4 and 4' permit the relative locking of the record carrying member 1 and the base member 3 so that there will be no danger of the record carrying member 1 slipping off the springs 2 or of the pins 13 becoming broken during transportation when the record carrying member 1 and the base member 3 may be in a position perpendicular to the horizontal.

It is clear that the upper portions 12 and 12' of the levers 4 and 4' respectively may easily be hand operated from above the record carrying member 1. However, since the upper portions 12 and 12' are normally located beneath the turntable, inadvertent operation of the levers 4 and 4' or unauthorized operation thereof can be avoided.

Figure 6:
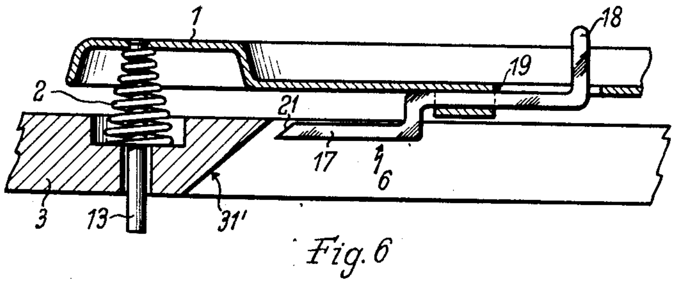
Fig. 6 is a view showing a second embodiment of the position fixing and vibration-limiting arrangement of the present invention.
Figure 7:
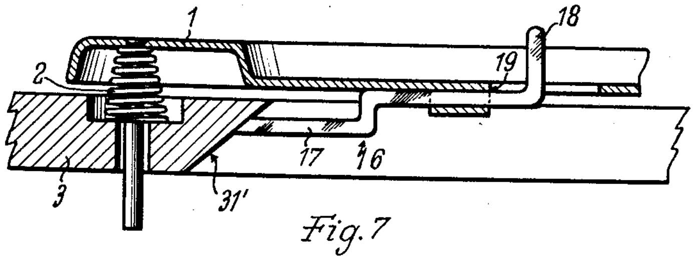
Fig. 7 is a transverse sectional view similar to Fig. 6, showing the position fixing and vibration-limiting arrangement of Fig. 6 in a second position.
Figure 8:
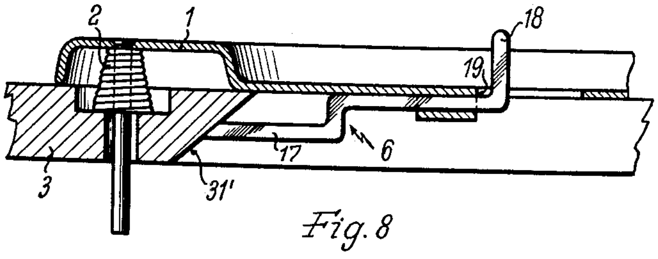
Fig. 8 is a transverse sectional view similar to Figs. 6 and 7 and showing the arrangement in still a third position.

Referring now to Figs. 6, 7 and 8, it can be seen that the rotatable lever 4 has been replaced by a slidably mounted lever 6 having a lower portion 17 and an upper portion 18 which extends through a hole 19 in the record carrying member 1. In this embodiment the inner face 31' of the base member 3 flares outwardly away from the opening so that the inner face 31' is at an angle other than 90° with respect to the plane of the base member 3. Similarly, the lower lever portion 17 of the lever 6 has a slanting outer edge 21 at its free end portion. It can be seen that the outer edge 21 is substantially parallel to the inner face 31' which bounds the opening in the base member 3.

In the embodiment of Fig. 6 the lever 6 has been extended radially inward so that the free end portion of the lower lever portion 17 is wholly within the opening of the base member 3. In this position, the record carrying member 1 can be removed from the base member 3. In this respect it should be noted that the coil spring 2 may also be fixed to the pin 13 of the record carrying member 1 so that the spring 2 would also be removed with the record carrying member 1.

In the position illustrated in Fig. 7, the lever 6 has been moved radially outward so that the slanting outer edge 21 of the free end portion of the lower lever 17 partially engages the slanting inner face 31'. In this position it can be seen that the spring 2 has been partially compressed to bring the record carrying member 1 closer to the base member 3 than in the position illustrated in Fig. 6. This corresponds to the playing position and it is clear that the maximum amplitude of oscillation of the record carrying member 1 with respect to the base member 3 is limited by the distance between the lower edge of the record carrying member 1 from the base member 3.

In Fig. 8 the lever 6 has been moved radially outward so that the slanting outer edge 21 of the lower lever portion 17 of the lever 6 fully engages the inner face 31' of the base member 3. In this position the spring 2 is shown substantially completely compressed so that the record carrying member 1 is fixedly connected to the base member 3. It is clear that this is the transport position wherein the record player may be oriented so that the record carrying member 1 and the base member 3 are in a position substantially vertical to the horizontal. That is, the record player is moved approximately 90° from its normal playing position.

With the present invention it is apparent that the position fixing and vibration-limiting arrangement including either the levers 4 and 4' or the lever 18, can be moved through a plurality of positions. That is, in Fig. 4, which corresponds to the playing position of the lever 4', the distance *a* may be varied by rotation of the lever 4' so that the maximum amplitude of vibration or oscillation can be limited. Similarly, in Fig. 7 the lever 6 may be slid radially outward so that the spring 2 is either more or less compressed thereby again limiting the maximum amplitude of oscillation of the record carrying member 1.

In the rotatable lever arrangement of Figs. 1–5, the lower lever portion is at an angle which is larger than 90° with respect to the upper lever portion 12 and 12' respectively. In the arrangement of Figs. 6–8, the lower lever portion 17 is at an angle of substantially 90° to the upper portion 18.

It will be understood that each of the elements described above, or two or more together, may also find a useful application in other types of mounting arrangements differing from the types described above.

While the invention has been illustrated and described as embodied in vibration-free record player mounting arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a record player, in combination, a base member; a record carrying member removably mounted on said base member and removable therefrom in a predetermined direction; resilient means mounted between said base member and said record carrying member and resiliently urging the latter away from said base member; and a combined position fixing and vibration-limiting arrangement independent of said resilient means and mounted on one of said members and adapted to engage the other of said members, said other member and said arrangement having respective contact surfaces for mutual engagement of at least respective areas thereof, one of said surfaces being inclined relative to said direction at an acute angle, said arrangement being slidable in a direction perpendicular to said predetermined direction through a plurality of positions, in a first of which said respective areas of said contact surfaces are in engagement, whereby arrangement fixedly connects said carrying member to said base member so as to prevent relative movement between the same, whereas in a second of said positions of said arrangement said contact surfaces are out of engagement and out of alignment in said predetermined direction, whereby said arrangement permits removal of said record carrying member from said base member, and in at least one intermediate position said contact surfaces are out of engagement and at least respective areas thereof are spacedly aligned in said predetermined direction, whereby said arrangement limits the range of amplitude of oscillation of said members relative to each other, said aligned area of said one inclined contact surface in said intermediate position and said engaged area thereof in said first position being spaced relative to each other in said predetermined direction.

2. In a record player, in combination, a base member having an opening therethrough bounded by an inner face thereof; a record carrying member mounted on said base member, substantially covering said opening and removable therefrom in a predetermined direction; resilient means mounted between said base member and said record carrying member adjacent said opening and resiliently urging said record carrying member away from said base member; and at least one combined position fixing and vibration-limiting lever mounted on said record carrying member adjacent said inner face of said base member and adapted to engage said inner face, said inner face and said lever having respective contact surfaces for mutual engagement of at least respective areas thereof, one of said surfaces being inclined relative to said direction at an acute angle, said lever being slidable in a direction perpendicular to said predetermined direction through a plurality of positions, in a first of which said lever extends in said opening between said inner face of said base member and said record carrying member and respective areas of said contact surfaces are in engagement so as to fixedly connect said carrying member to said base member, whereas in a second of said positions of said lever said contact surfaces are out of engagement and out of alignment in said predetermined direction, whereby said lever permits removal of said record carrying member from said base member, and in at least one intermediate position said contact surfaces are out of engagement and at least respective areas thereof are spacedly aligned in said predetermined direction, whereby said lever is spaced from said base member to limit the range of amplitude of oscillation of said members relative to each other, said aligned area of said one inclined contact surface in said intermediate position and said engaged area thereof in said first position being spaced relative to each other in said predetermined direction.

References Cited in the file of this patent

UNITED STATES PATENTS

| | | |
|---|---|---|
| 1,894,483 | Dowd | Jan. 17, 1933 |
| 2,289,514 | Mastney et al. | July 14, 1942 |
| 2,325,807 | Stephan | Aug. 3, 1943 |
| 2,520,341 | Rockola | Aug. 29, 1950 |
| 2,614,846 | Cain | Oct. 21, 1952 |
| 2,675,986 | Fisher | Apr. 20, 1954 |